United States Patent [19]

Sakamoto et al.

[11] Patent Number: 5,218,490
[45] Date of Patent: Jun. 8, 1993

[54] TAPE TENSION SERVO-SYSTEM FOR VIDEO TAPE RECORDING AND/OR REPRODUCING APPARATUS

[75] Inventors: Hitoshi Sakamoto; Toshiaki Kojima, both of Kanagawa, Japan

[73] Assignee: Sony Corporation, Tokyo, Japan

[21] Appl. No.: 782,867

[22] Filed: Oct. 15, 1991

Related U.S. Application Data

[62] Division of Ser. No. 512,412, Apr. 23, 1990, Pat. No. 5,150,263.

[30] Foreign Application Priority Data

Apr. 25, 1989 [JP] Japan .................................. 1-104895

[51] Int. Cl.$^5$ ............................................. G11B 15/43
[52] U.S. Cl. ........................................ 360/71; 360/69; 318/6
[58] Field of Search .................. 318/6, 7; 360/69, 71, 360/73.04–73.14, 84, 85, 130.21, 130.22

[56] References Cited

U.S. PATENT DOCUMENTS

| | | | |
|---|---|---|---|
| 4,104,685 | 8/1978 | Chang | 360/84 |
| 4,533,968 | 8/1985 | Yoshida et al. | 360/130.21 |
| 4,594,619 | 6/1986 | Hijikigawa | 360/130.22 |
| 4,649,441 | 3/1987 | Louth | 360/71 |
| 4,731,679 | 3/1988 | O'Gwynn et al. | 360/73.14 |

*Primary Examiner*—Jerry Smith
*Assistant Examiner*—Steven R. Garland
*Attorney, Agent, or Firm*—William S. Frommer; Alvin Sinderbrand

[57] ABSTRACT

In a video tape recording and/or reproducing apparatus, a tape tension servo-system detects tape tension between a supply reel propelled by a voltage driven motor and the head drum to provide a corresponding detected tension signal supplied to a processor which is periodically interrupted for providing a control signal proportional to any deviation of the detected tape tension from a desired value and further for providing differential and integral control signals determined from the proportional control signal at successive interruptions and which are combined to form a control voltage signal for the supply reel motor. The processor is desirably constituted by a universal pulse processor and a central processing unit. The tape tension is detected by an angularly movable arm carrying a post about which the tape is wrapped sufficiently to ensure good compliance. The detecting arm and post are of light weight materials so as to be readily responsive to changes in tension and are arranged so that angular displacements of the area are not influenced by gravity.

2 Claims, 14 Drawing Sheets

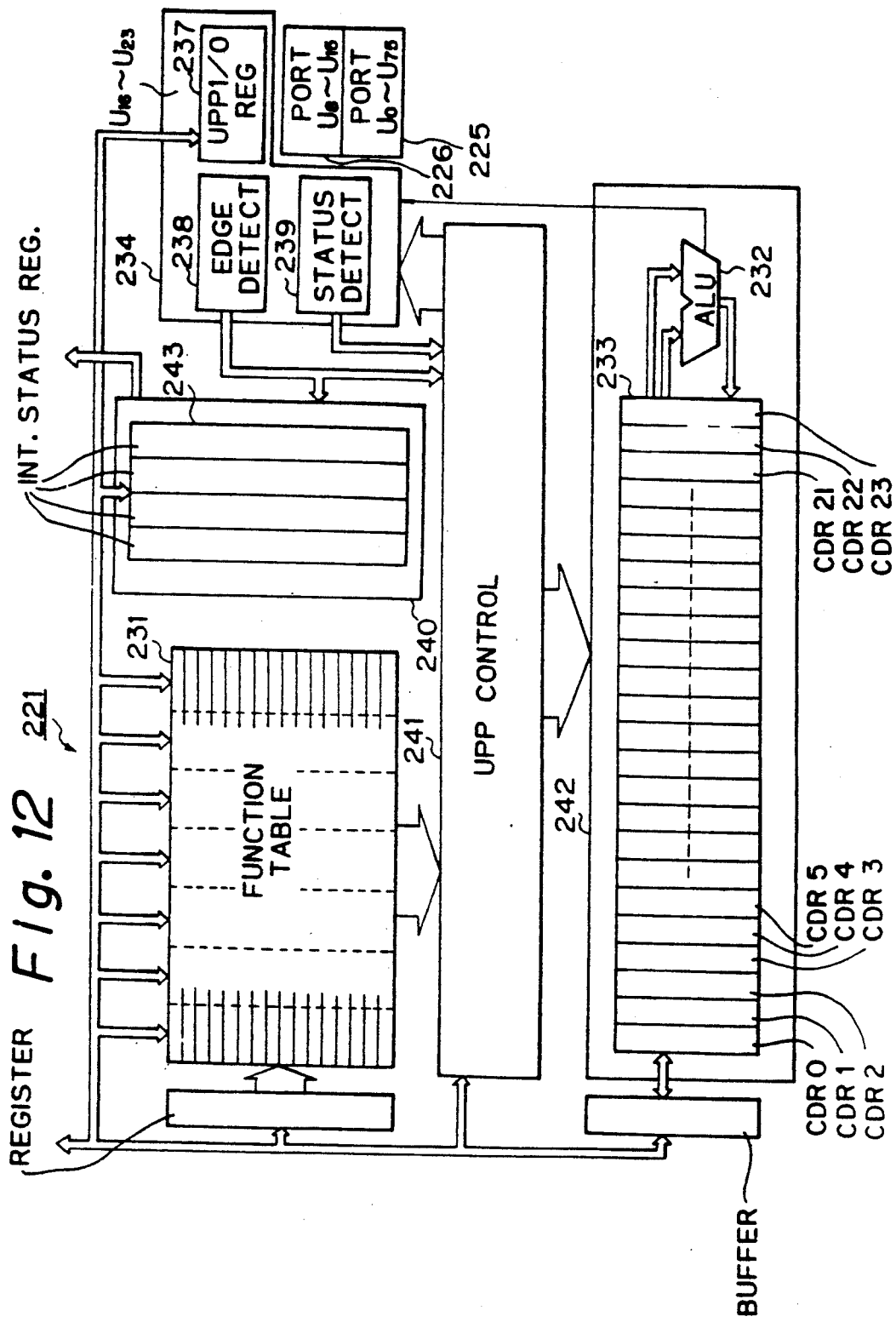

TAPE TENSION SERVO-SYSTEM FOR VIDEO TAPE RECORDING AND/OR REPRODUCING APPARATUS

This application is a division of U.S. patent application Ser. No. 07/512,412, filed Apr. 23, 1990, now U.S. Pat. No. 5,150,263.

BACKGROUND OF THE INVENTION

1. Field of the Invention

This invention relates generally to a tape tension servo-system for video tape recording and/or reproducing apparatus.

2. Description of the Prior Art

A video tape recording and/or reproducing apparatus (VTR) has been provided with a tape tension servo-system in which an arm mounted for angular movement carries a post engaged by the tape, for example, between the supply reel and the so-called head drum, so that the tape tension can be detected from the angular position of the arm, whereupon a motor coupled with the supply reel is driven in accordance with the detected tape tension so as to maintain the latter at a desired value. In the known VTR, the supply reel motor is electric current driven in accordance with the detected tape tension. In the case of an electric current drive, the motor torque is controlled for achieving the desired tape tension so as to permit a necessary torque to be established in advance. By reason of the foregoing, in the case of an electric current drive, the supply reel motor can be controlled, at least to some extent, even if a strong feedback servo is not obtained.

However, an electric current drive is highly susceptible to external disturbances, such as, vibrations and rolling or changes in orientation of the motor, as is inevitable in the case of a portable VTR.

Although it is known that a voltage driven motor is not susceptible to such external disturbances, a voltage drive serves to control the motor speed, and hence a desired motor torque cannot be established in advance. The existing tape tension detecting devices are neither sufficiently responsive nor sufficiently accurate to permit the use of a voltage driven motor controlled in response to the detected tape tension deviations for driving the supply reel.

It is known also to provide a VTR with a central processing unit (CPU) or micro-processor for determining the drive signals to be supplied to the servo-systems for the supply and take-up reels, the capstan and the head drum of the VTR. In such case, numerous counters are required for detecting various phase differences or time differences to be used by the CPU in determining the various drive signals for the several servo systems on the basis of phase (PG) pulses and frequency (FG) pulses provided by respective generators associated with the supply and take-up reels, the capstan and the head drum, respectively. However, the use of individual counters for determining the various phase and time differences undesirably increases the complexity and cost of the hardware or hard-wired components required for the servo-systems. Further, by employing the CPU for all calculations required in connection with the operation of the various servo-systems, an undesirably heavy load is imposed on the CPU which is thereby unavailable for performing other functions.

OBJECTS AND SUMMARY OF THE INVENTION

Accordingly, it is an object of this invention to provide a servo-system for a VTR which avoids the above mentioned disadvantages of the prior art.

More specifically, it is an object of this invention to provide a tape tension servo-system which is particularly suited for use in a portable VTR of high quality, for example, of a quality consistent with that embodied in professional VTRs normally permanently installed in broadcasting or recording studios.

Another object of this invention is to provide a tape tension servo-system for a portable VTR which reliably maintains a desired tape tension even when the VTR is subjected to external disturbances, such as, vibrations and rolling or changes in orientation.

Still another object of this invention is to provide a servo-system for a VTR in which drive signals for the reel, capstan and drum servos may all be determined by a common CPU while avoiding the imposition of a heavy processing load on the latter so that the common CPU may be employed for functions other than those associated with the servo system.

A further object is to provide a tape-tension- servo-system for a VTR, as aforesaid, in which a desired tape tension can be accurately maintained even though the VTR is portable.

In accordance with an aspect of this invention, a video tape recording and/or reproducing apparatus having a rotary mechanism, such as, a supply reel, rotated by a respective drive motor in a manner to vary a characteristic of the apparatus, such as, the tape tension, which influences the recording and/or reproducing of video signals in slant tracks on a tape during longitudinal advancement of the tape, is provided with a servo-system for controlling such characteristic which comprises measuring means for measuring a value of the tape tension or other characteristic and providing a corresponding measured signal, universal or multi-function pulse processing means receiving the measured signal and processing the same to provide a respective error signal, and a central processing unit receiving the error signal and generating a corresponding control signal applied to the drive motor for controlling the latter in the sense to restore the tape tension or other characteristic to a desired value.

It will be appreciated that, in the above arrangement, the universal pulse processor performs processing independently of the CPU and thereby frees the latter for other functions. More specifically, FG and PG pulses indicating the speeds and phases of the supply and take-up reels, the capstan and the head drum may be supplied to the universal pulse processor which detects phase differences or time differences for use in phase and speed detection, and which supplies corresponding signals to the CPU so that the latter may, on the basis thereof, determine the drive signals for the reel, capstan and drum servos.

In accordance with another aspect of this invention, a video tape recording and/or reproducing apparatus having a drum about which a tape is wrapped between supply and take-up reels, rotary head means associated with the drum for recording and/or reproducing video signals in slant tracks on the tape during longitudinal advancement of the tape, a capstan driven by a capstan motor and engageable with the tape between the drum and the take-up reel for effecting the longitudinal advancement of the tape, and a voltage driven supply reel motor and a take-up reel motor for driving the supply reel and the take-up reel, respectively, is provided further with a tape tension servo system which comprises a pivotally mounted tension detecting arm carrying a guide post engaged by the tape between the supply reel and the drum so that the arm is angularly displaced about its pivoting axis in sensitive and accurate response to changes in the tape tension, means for generating a voltage signal which varies with the angular displacement of the arm about the pivoting axis, and processing means which receives the voltage signal and converts the same to a corresponding drive voltage for the supply reel motor. In the foregoing tape tension servo-system according to this invention, the tension detecting arm is disposed so that, in normal orientations of a portable VTR having such servo system, there is little if any gravitational influence on the angular displacements of the tension detecting arm, whereby the latter may accurately reflect changes in the tape tension. Furthermore, the tension detecting arm and guide post are desirably of light-weight materials so as to have a small inertia, and the tape has a wrap angle of approximately 150 degrees about the guide post, whereby the arm is highly sensitive, in its angular displacements, to any changes in the tape tension, but separation of the guide post from the tape, and the resultant imparting of undesirable vibrations to the tape are avoided.

In accordance with still another aspect of this invention a video tape recording and/or reproducing apparatus having a rotary mechanism, such as, a tape supply reel, rotated by a respective drive means in a manner to vary tape tension, is provided with a tension servo-system comprising means for detecting tape tension and providing a corresponding detected tension signal, processing means receiving the detected tension signal for generating a corresponding control signal applied to the drive means in the sense to maintain the tape tension at a desired value, and means periodically applying tension interrupt signals to the processing means which is programmed to execute an interrupt processing routine in response to each tension interrupt signal and in which the processing means generates a control signal proportional to deviation of the then detected tape tension from the desired value, a differential control signal corresponding to the difference between the tape tension deviations at successive tension interrupt signals and an integral control signal with the proportional, differential and integral control signals being combined for providing the control signal applied to the drive means.

The above, and other objects, features and advantages of this invention, will be apparent in the following detail description of illustrative embodiments when read in connection with the accompanying drawings in which corresponding parts are identified by the same reference numerals in the several views.

BRIEF DESCRIPTION OF THE DRAWINGS

FIG. 12 is a block diagram showing, in greater detail, a universal pulse processor core included in the universal pulse processor of FIG. 11.

DETAILED DESCRIPTION OF PREFERRED EMBODIMENTS

Figure 1A:
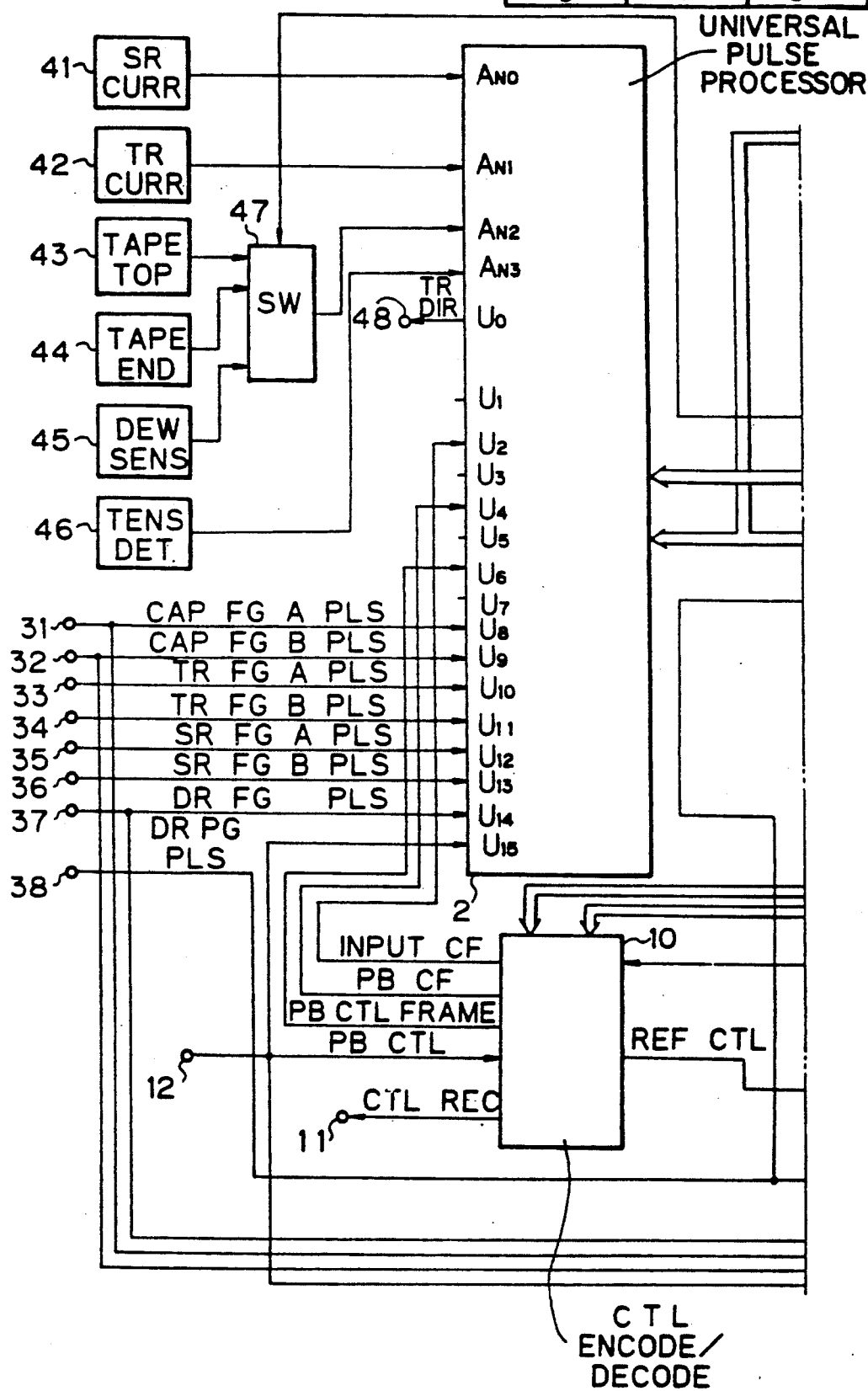
FIGS. 1A-1C are a block diagram showing a servo-system in accordance with an embodiment of this invention.
Figure 1B:
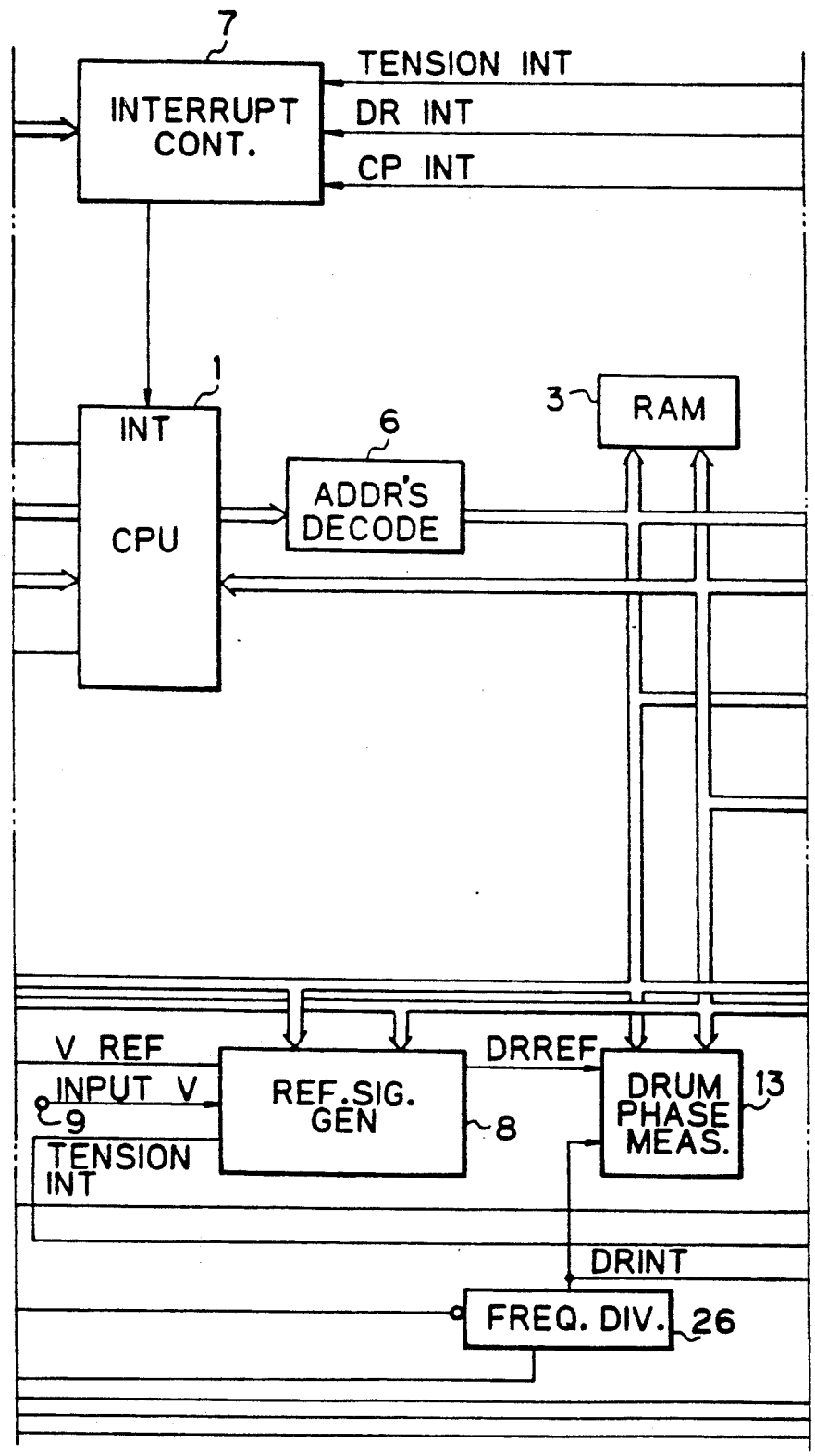
Figure 1C:
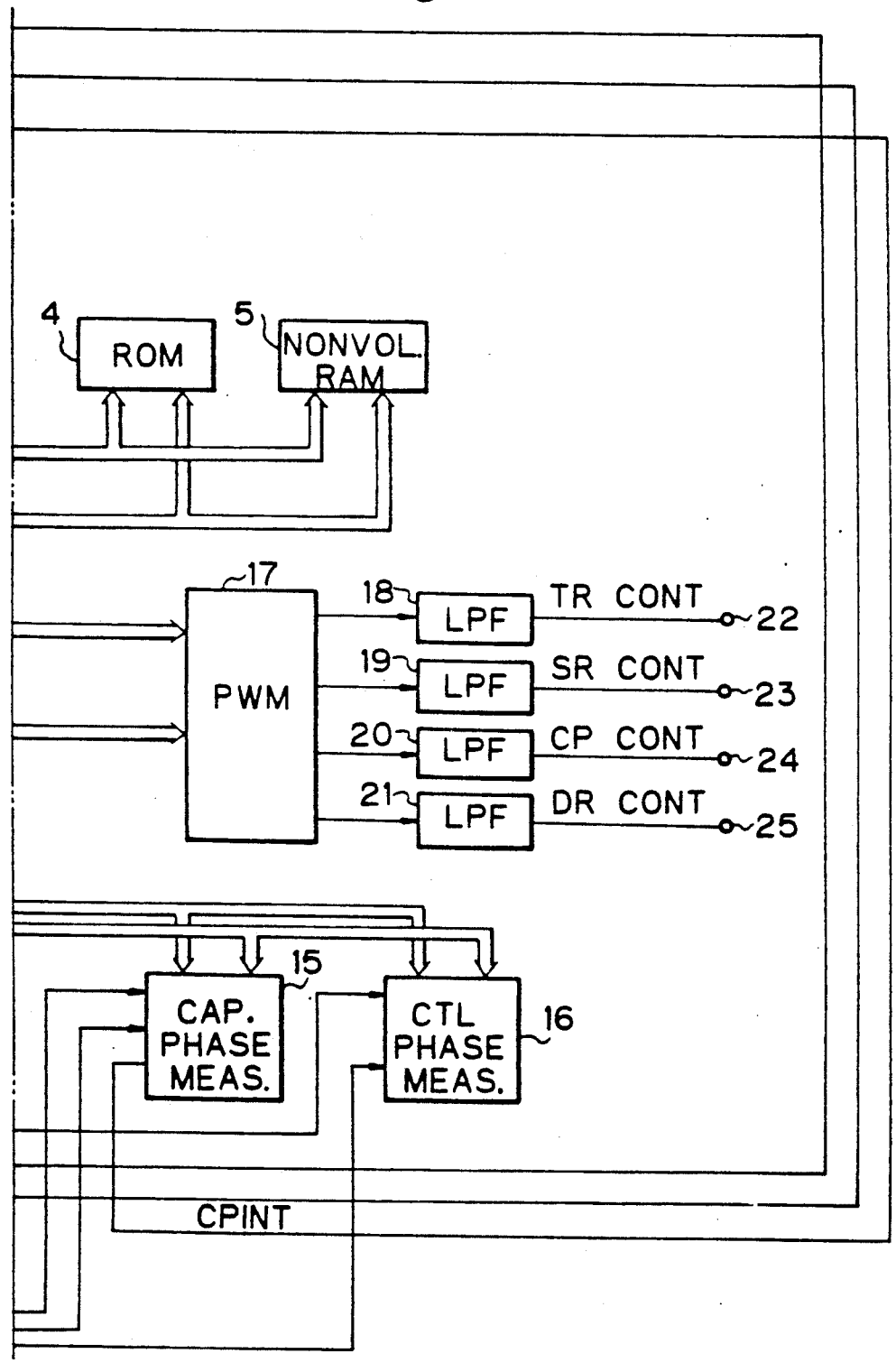

Referring initially to FIG. 1, it will be noted that the invention is there shown embodied in a system for servo controlling take-up and supply reel motors, a capstan motor and a drum motor in a video tape recorder (VTR) which is preferably portable.

GENERAL ARRANGEMENT OF THE SERVO SYSTEM

The servo system shown in FIG. 1 generally includes a CPU 1 for controlling the whole system, and a multi-function or universal pulse processor 2 for processing various pulse signals. The CPU 1 and the universal pulse processor 2 are connected through an address bus and a data bus. The CPU 1 is also shown to be connected through the address bus and the data bus with a RAM 3, a ROM 4 and a non-volatile RAM 5 for storing data for adjustment. An address decoder 6 is shown interposed in the address bus.

An interrupt controller 7 is adapted to provide an interrupt signal to an interrupt input terminal INT of the CPU 1, whereupon, the CPU 1 goes to an interrupt processing routine.

A reference signal generator 8 is provided for developing various reference signals necessary for effecting servo control, and receives a vertical synchronization signal INPUT V of a video signal from an input terminal 9. Based on this vertical synchronization signal INPUT V of the video signal, the generator 8 produces a reference vertical signal V REF, a drum rotation reference signal DR REF and a tension interrupt signal TENSION INT.

A control signal (CTL) encoder/decoder 10 is operative, in a recording mode of the VTR, to form a recording CTL signal CTL REC which is supplied to an output terminal 11 for conventional recording in a CTL track on the tape by a stationary CTL head (not shown). In a playback mode of the VTR, a reproduced or playback control signal PB CTL is reproduced from the tape by the CTL head and is supplied to the CTL encoder/decoder 10 at an input terminal 12. The playback control signal PB CTL is also supplied from terminal 12 to an input terminal $U_{15}$ of the universal pulse processor 2. In response to the playback CTL signal PB CTL, the CTL encoder/decoder 10 produces a playback CTL color frame pulse PB CF, and a playback CTL frame pulse PB CTL FRAME. The playback CTL color frame pulse PB CF is a signal which changes every four frame periods and is applied to an input terminal $U_4$ of the universal pulse processor 2. The playback CTL frame pulse PB CTL FRAME is a signal which varies every frame period and is applied to an input terminal $U_6$ of the universal pulse processor 2. Further, the CTL encoder/decoder 10 produces a reference color frame pulse INPUT CF on the basis of the reference vertical signal V REF from the reference vertical generator 8, and such pulse INPUT CF is applied to an input $U_2$ of the universal pulse processor. Finally, a reference CTL signal REF CTL is developed by the CTL encoder/decoder 10.

The servo system of FIG. 1 further includes a drum phase measurement device 13 which is used in performing rotation control of the head drum. The drum rotation reference signal DR REF from the reference signal generator 8 and a drum interrupt signal DR INT from a frequency divider 26 are supplied to the drum phase measurement device 13 which measures a phase difference between the drum rotation reference signal DR REF and the drum interrupt signal DR INT.

A capstan phase measurement device 15 is employed for performing high speed control of capstan speed. Two-phase capstan FG or tach pulses CAP FG A PLS and CAP FG B PLS are supplied from input terminals 31 and 32 to the capstan phase measurement device 15 which measures a phase difference between the capstan FG pulses CAP FG A PLS and CAP FG B PLS.

A CTL phase measurement device 16 is employed to perform a CTL tracking servo. The reference CTL signal REF CTL from the CTL encoder/decoder 10 and the playback CTL signal PB CTL from the input terminal 12 are supplied to the CTL phase measurement device 16 which measures a phase difference between the reference CT signal REF CTL and the playback CTL signal PB CTL.

A pulse width modulated (PWM) signal output circuit 17 provides for the servo-controlled motors respective PWM signals whose pulse widths change in accordance with the controlled states of the respective motors. The PWM signals are supplied to output terminals 22–25 through direct current converting circuits 18–21, respectively, which may be constituted by low pass filters, and which provide respective control signals. More specifically, a control signal TR CONT for a take-up reel motor is derived at the output terminal 22; a control signal SR CONT for a supply reel motor is derived at the output terminal 23; a control signal CP CONT for a capstan motor is derived at the output terminal 24; and a control signal DR CONT for a drum motor is derived at the output terminal 25.

The reference signal generator 8, CTL encoder/decoder 10, drum phase measurement device 13, capstan phase measurement device 15, CTL phase measurement device 16, and PWM output circuit 17 are also shown to be connected to the CPU 1 through the address bus and data bus.

The A-phase capstan FG pulse CAP FG A PLS is supplied to the input terminal 31 from an FG or tach generator (not shown) conventionally associated with the capstan motor for detecting the rotation thereof. Such capstan FG pulse CAP FG A PLS is supplied from terminal 31 to a pulse input terminal $U_8$ of the universal pulse processor 2 and, as earlier noted, to the capstan phase measurement device 15.

The B-phase capstan FG pulse CAP FG B PLS is also supplied from the FG generator associated with the capstan motor to the input terminal 32. The capstan FG pulse CAP FG B PLS is supplied from the terminal 32 to an input terminal $U_9$ of the universal pulse processor 2 and, as earlier noted, to the capstan phase measurement device 15.

An A-phase take-up reel FG pulse TR FG A PLS from an FG generator (not shown) conventionally provided for detecting the rotation of the take-up reel is supplied through an input terminal 33 to a pulse input terminal $U_{10}$ of the universal pulse processor 2.

A B-phase take-up reel FG pulse TR FG B PLS from the FG generator provided for detecting the rotation of the take-up reel is supplied through an input terminal 34 to a pulse input terminal $U_{11}$ of the universal pulse processor 2.

An A-phase supply reel FG pulse SR FG A PLS from an FG generator (not shown) conventionally provided for detecting the rotation of the supply reel is supplied through an input terminal 35 to a pulse input terminal $U_{12}$ of the universal pulse processor 2.

A B-phase take-up reel FG pulse SR FG B PLS from the FG generator provided for detecting the rotation of the supply reel is supplied through an input terminal 36 to a pulse input terminal $U_{13}$ of the universal pulse processor 2.

A drum FG pulse DR FG PLS from an FG generator associated with a drum motor, as hereinafter described, for detecting the rotational speed of the drum is supplied through an input terminal 37 to a pulse input terminal $U_{14}$ of the universal pulse processor 2 and to a clock input terminal of the frequency divider 26.

A drum PG pulse DR PG PLS from an PG generator also associated with the drum motor for detecting a rotation phase of the drum is fed through an input terminal 38 to a reset terminal of the frequency divider 26 and to the CPU 1 as a drum PG flag.

The supply reel motor current is detected by a supply reel current detector 41, and the resulting detection output is supplied to an analog input terminal $A_{N0}$ of the universal pulse processor 2. A take-up reel current detector 42 detects the take-up reel motor current and the resulting detection output is supplied to an analog input terminal $A_{N1}$ of the universal pulse processor 2.

A tape top detector 43 detects a marker indicating the top of the tape, and a tape end detector 44 detects a marker indicating a tape end. The formation of dew is detected by a dew detector 45. Detection outputs of the tape top detector 43, the tape end detector 44 and the dew detector 45 are selectively supplied to an analog input terminal $A_{N2}$ of the universal pulse processor 2 through a switch circuit 47 which is switched by a switch signal from the CPU 1.

When an analog input is supplied to any one of the analog input terminals of the universal pulse processor 2, a limiter is needed for limiting the input signal. It will be appreciated that by selectively supplying plural detection signals through the switch circuit 47 to the same analog input terminal $A_{N2}$, the same limiter can be used for all of such detection signals so that the circuit is simplified.

A tension detector device 46 is provided for detecting an angle of a tension arm, as hereinafter described in detail, and the resulting detection output is supplied to an analog input terminal $A_{N3}$ of the universal pulse processor 2.

It is further to be noted that a take-up reel direction signal TR DIR is supplied to an output terminal 48 from an output terminal $U_0$ of the universal pulse processor 2.

Drum Servo

Figure 2A:
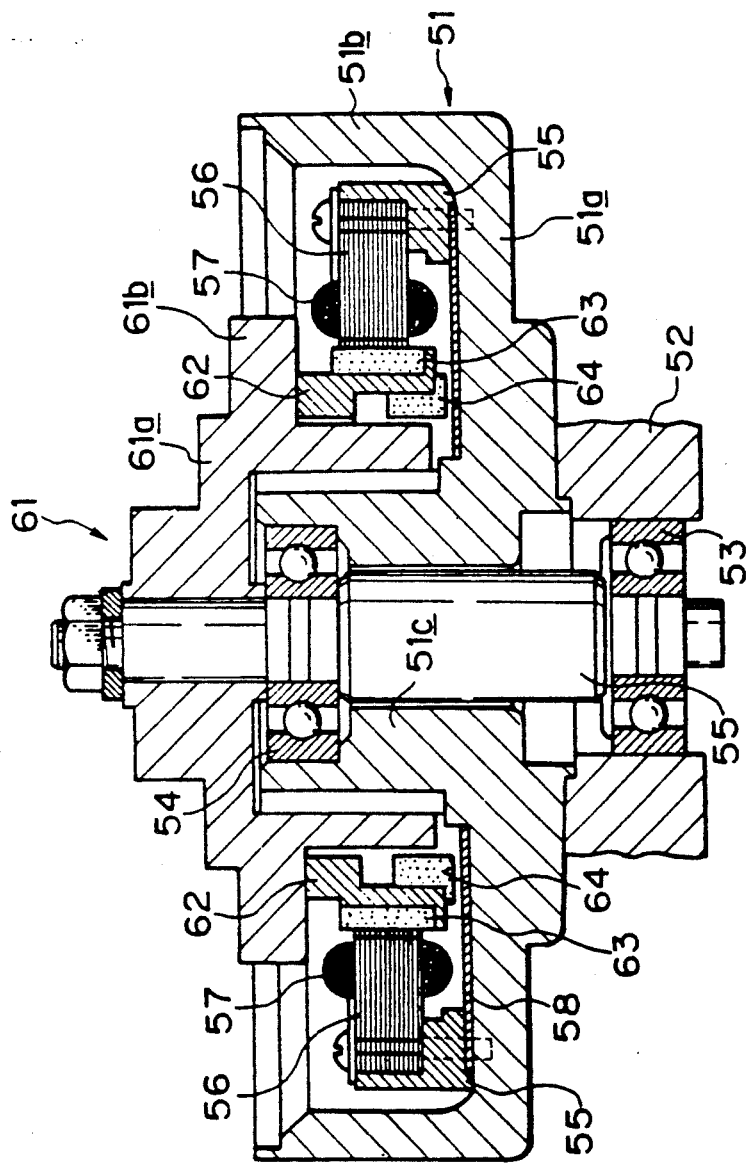
FIG. 2A is a sectional view taken along the line II—II on FIG. 2B and showing a portion of a drum assembly that may be employed in a VTR having the servo-system of FIG. 1.
Figure 2B:
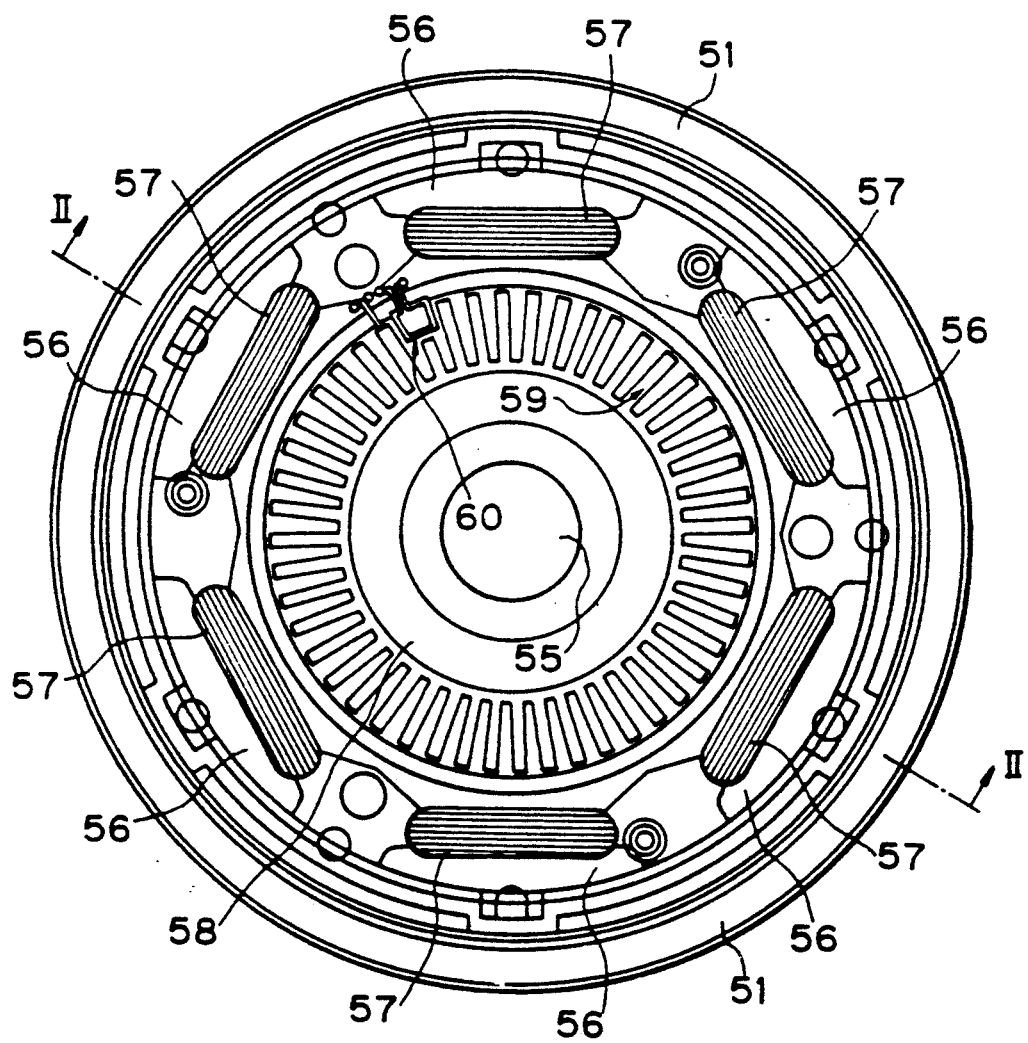
FIG. 2B is a top plan view of the portion of the drum assembly shown on FIG. 2A.

Referring now to FIGS. 2A and 2B, it will be seen that the drum for guiding the tape during the recording and/or reproducing of signals thereon by rotary heads (not shown) includes a lower drum portion 51 fixed on a stationary support 52.

Bearings 53 and 54 are provided between the stationary support 52 and the lower end of a shaft 55 and between a hollow boss 5/c at the center of the lower drum portion 51 and an upper portion of the shaft 55, respectively, so that the shaft 55 is free to rotate coaxially with respect to the lower drum portion 51.

A motor stator is constituted by an iron core 56 attached to the lower drum portion 51 through a holder 55, and coils 57 wound around the iron core 56.

In addition, a printed board 58 is arranged against the floor of the lower drum portion 51, and has an FG pattern 59 and a PG pattern 60 formed on the printed board, as shown in FIG. 2B.

A rotary assembly 6.1 includes a hub 61a secured on the upper end of the shaft 55 for rotation with the latter, and a radially outward directed flange 61b extending from the hub 61a at about the level of the upper free edge of a generally cylindrical peripheral flange 51b extending upwardly from the outer margin of the floor 51a of the lower drum portion 51. A holder 62 depends from the flange 61b, and a rotor or main magnet 63 and an auxiliary or tach magnet 64 are fixed to the holder 62. The main magnet 63 is disposed radially opposite the iron core 56 around which the coils 57 are wound. The motor for driving the rotary assembly 61 is composed of the main magnet 63 and the coils 57 wound around the iron core 56.

The auxiliary-magnet 64 is arranged axially opposite to the printed board 58 on which the FG pattern 59 and the PG pattern 60 are formed. Printed FG and PG generators are constituted by magnet 64 and the FG pattern 59 and the PG pattern 60, respectively, formed on the printed board 58.

Figure 3:
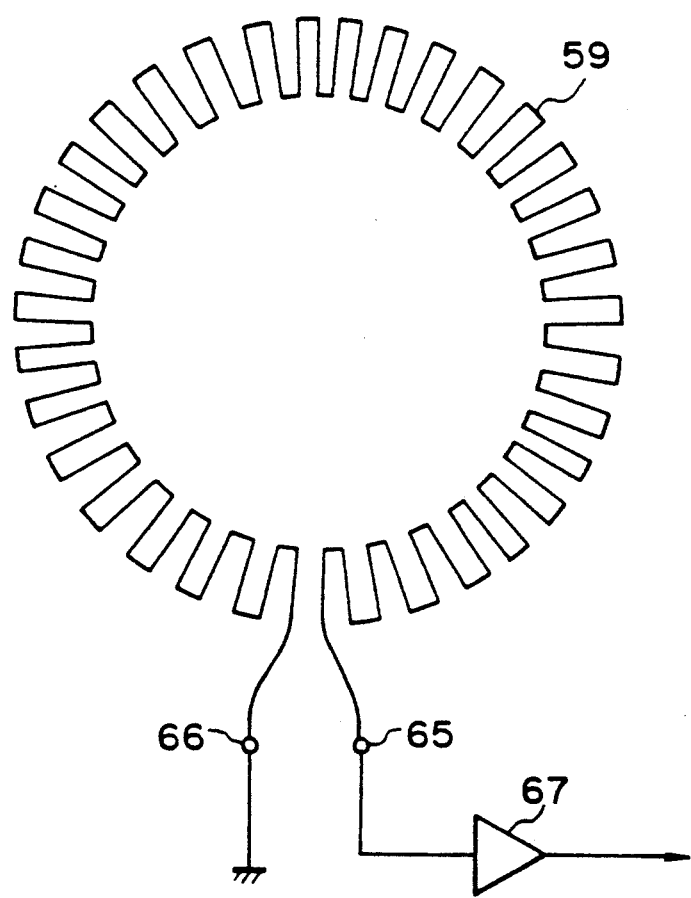
FIG. 3 is a wiring diagram illustrating an FG pattern on a printed circuit board included in the drum assembly of FIGS. 2A and 2B FIGS. 4A-4H are waveforms to which reference will be made in describing the operation of a drum servo in the servo system of FIG. 1.

The FG pattern 59 formed on the printed board 68 has a continuous, generally rectangularly shaped pattern arranged along the circumference at equal intervals. Terminals 65 and 66 are led from the opposite ends of the FG pattern 59 (FIG. 3). One terminal 66 is connected to a reference potential point, such as, ground, while the other terminal 65 is connected to an input terminal of an amplifier 67 from which the drum FG signal DR FG PLS is derived.

Figure 4:
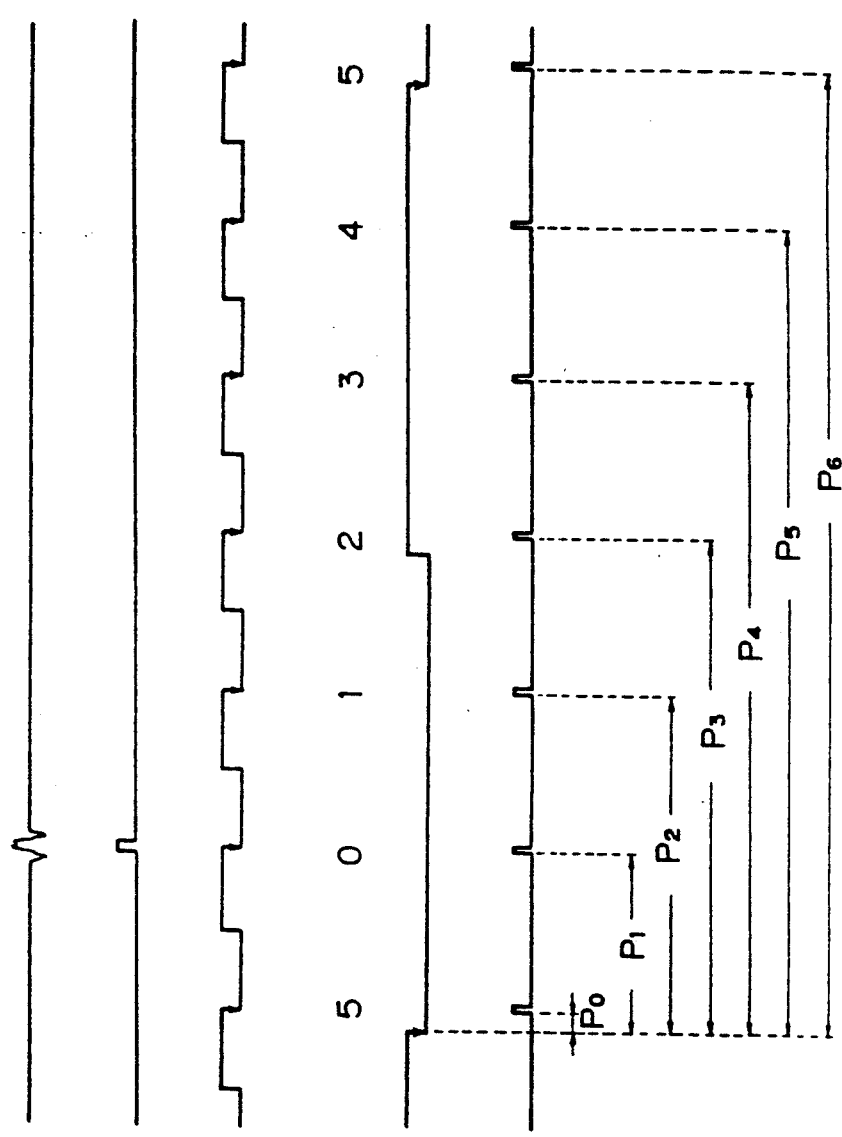

As earlier noted, the printed board 58 with the FG pattern 59 and the PG pattern 60 formed thereon is fixed to the lower drum portion 51. On the other hand, the auxiliary magnet 64 is fixed to the flange 61 through the holder 62, and thus rotates with the assembly 61 relative to the printed board 58. When the magnet 64 rotates, an electromotive force (FIG. 4A) is generated by the coaction of the magnet 64 with the FG pattern 59 and is applied to the amplifier 67. The resulting signal from amplifier 67 constitutes an FG signal, and is shaped to provide the drum FG pulse DR FG PLS (FIG. 4B).

Since the FG signal is generated by the electromotive force in the above described printed FG generator, no direct current component occurs in the FG signal. For this reason, there is no need to perform direct current offset compensation, so that simplification of the hardware can be achieved.

The PG pattern 60 is formed on the printed board 58 at a position corresponding to a predetermined phase or rotational position of the rotary heads (not shown) which are suitably mounted on the flange 61b for rotation with 61 of the drum. The PG pattern 60 has a double coil pattern. When the auxiliary magnet 64 rotates, an electromotive force is provided from the PG pattern 60 at said predetermined phase during each rotation. This electromotive force is used as a PG signal (FIG. 4C), and the drum PG pulse DR PG PLS (FIG. 4D) is provided from the PG signal.

Since the patterns 59 and 60 can be formed on the printed board 58 with extremely high accuracy, the rotation frequency and phase of the drum can be detected with very high accuracy. Further, since the FG pattern 59 and the PG pattern 60 are formed on the same printed board 58, the phase relationship between the FG pattern 59 and the PG pattern 60 can be controlled with high precision. As a result, no phase compensation is needed for the FG pulse and the PG pulse.

Description of Drum Servo Operation

With rotation of the rotary assembly 61 of the drum, a drum FG signal is provided with the waveform shown in FIG. 4A. The drum FG signal is rectangularly shaped to provide the drum FG pulse DR FG PLS (FIG. 4B) which is supplied to the input terminal 37. The drum FG pulse DR FG PLS is supplied to the clock input terminal of the frequency divider 26 from the input terminal 37 in FIG. 1.

Simultaneously, with rotation of the rotary assembly 61 of the drum, a drum PG signal is provided, as shown in FIG. 4C. Such drum PG signal is rectangularly shaped so that the drum PG pulse DR PG PLS is obtained at the input terminal 38, a shown in FIG. 4D. The drum PG pulse DR PG PLS is supplied from input terminal 38 to the reset terminal of the frequency divider 26 and to the CPU I as a drum PG flag.

Because the FG pattern 59 and the PG pattern 60 are formed on the same board, the phase relationship between the drum PG pulse DR PG PLS and the drum FG pulse DR FG PLS is set correctly.

It is a feature of the drum servo circuit according to an embodiment of the invention that common hardware can achieve speed measurement for forming a drum speed loop and phase measurement for forming a drum phase loop. This becomes possible because of the use of the printed FG generator for allowing drum rotation frequency information to be provided with high precision.

More specifically, the drum FG pulse DR FG PLS (FIG. 4B) is frequency divided by eight in the frequency divider 26, as shown in FIG. 4E. In each revolution of the rotary assembly 61 of the drum, the drum FG pulse DR FG PLS (FIG. 4B) is output in the form of 48 rectangular waves. Therefore, six cycles or waves of the frequency divided by eight signal DR FG/8 (FIG. 4E) are provided by the frequency divider 26 during each rotation of the drum.

The frequency divider 26 is reset by the drum PG pulse DR PG PLS (FIG. 4D). Simultaneously, as shown in FIG. 4F, the CPU 1 counts the frequency-divided by eight signal DR FG/8 from the frequency divider 26.

The application of the drum PG pulse DR PG PLS as a flag to the CPU 1 causes the count value of the frequency-divided by eight signal DR FG/8 to be initially set at "0". As later described in detail, every time the frequency-divided by eight signal DR FG/8 from the frequency divider 26 falls down, a drum interrupt signal DR INT (FIG. 4H) is supplied to the interrupt controller 7 so that the CPU I enters an interrupt processing routine. Each time this occurs, the frequency-divided by eight signal DR FG/8 is counted.

The output or drum interrupt signal DR INT from the frequency divider 26 is also supplied to the drum phase measurement device 13, which further receives the drum rotation reference signal DR REF (FIG. 4G) from the reference signal generator 8. Phase difference data representing the difference between the trailing, or down-going side of the reference signal DR REF and each frequency-divided by eight signal DR FG/8 from the frequency divider 26 is obtained at an output of the drum phase measurement device 13 and supplied through the data bus to the CPU 1.

The trailing side of the frequency-divided by eight signal DR FG/8 (FIG. 4E) from the frequency divider 26 acts as the drum interrupt signal DR INT for the interrupt controller 7. In response to the signal DR INT, the interrupt controller 7 causes the CPU 1 to go to an interrupt processing routine in which it sequentially takes in phase difference data $P_0$, $P_1$, $P_2$, ... $P_5$ between the trailing or down-going side of the reference signal DR REF and the successive outputs DR INT of the frequency divider 26. Simultaneously, as shown in FIG. 4F, the frequency-divided by eight signal DR FG/8 from the frequency divider 26 is counted from "0" to "5" by the CPU 1.

Since each drum FG pulse DR FG PLS correctly provides information on the rotational speed of the drum, speed data can be provided from differences between successive phase difference data $P_0$, $P_1$, $P_2$, ... $P_5$. More specifically, at the time of each frequency-divided by eight signal DR FG/8, the rotational speed is determined on the basis of the difference between the previous phase difference data and the present phase difference data, for example, the difference $(P_1-P_0)$ between phase difference data $P_0$ and phase difference data $P_1$, the difference $(P_2-P_1)$ between phase difference data $P_1$ and phase difference data $P_2$, the difference $(P_3-P_2)$ between phase difference data $P_2$ and phase difference data $P_3$, the difference $(P_4-P_3)$ between phase difference data $P_3$ and phase difference data $P_4$, and the difference $(P_5-P_4)$ between phase difference data $P_4$ and phase difference data $P_5$. A speed loop of the drum rotation control is formed from this rotation speed data.

As the CPU 1 counts the frequency-divided by eight signal DR FG/8 (FIG. 4E), it knows the phase of the frequency-divided by eight signal currently being input to the CPU from the drum PG pulse DR PG PLS (FIG. 4D) also input to the CPU. As a result, phase data can be detected from arbitrary ones of the phase difference data $P_0$ to $P_5$. A phase loop of the drum rotation control is developed from this phase data.

Capstan Servo

As earlier described with reference to FIG. 1, the two-phase capstan FG pulses CP FG A PLS and CP FG B PLS are supplied through the input terminals 31 and 32 to the capstan phase measurement device 15 which measures the phase difference between the two-phase capstan FG pulses CP FG A PLS and CP FG B PLS.

More specifically, when the phase difference between the two-phase capstan FG pulses CP FG A PLS and CP FG B PLS is measured by the capstan phase measurement device 15, a capstan interrupt signal CP INT is supplied to the interrupt controller 7 from the capstan phase measurement device 15. With the supply of the capstan interrupt signal CP INT to the interrupt controller 7, the CPU 1 is made to enter into an interrupt processing routine in which phase difference data corresponding to the difference between the two-phase capstan FG pulses CP FG A PLS and CP FG B PLS, as measured by the device 15, are taken into the CPU 1 through the data bus from the device 15. A speed loop of the capstan is formed by this phase difference data for controlling capstan speed during relatively high speed advancement of the tape.

However, it is to be noted that, at the time of low speed tape transport, the capstan speed servo uses the universal pulse processor 2, as described later.

CTL Tracking Servo

The earlier described playback CTL signal PB CTL reproduced by the CTL head is supplied through the input terminal 12 to the CTL phase measurement device 16 which also receives the reference CTL signal REF CTL fed from the CTL encoder/decoder 10.

The CTL phase measurement device 16 detects a phase difference between the playback CTL signal PB CTL and the reference CTL signal REF CTL and supplies corresponding phase difference data through the data bus to the CPU 1. Tracking control is then based on such phase difference data.

Tension Servo

Generally, in accordance with an embodiment of this invention, the tension servo is effected by a direct current motor having a voltage drive. In an electric motor having a current drive, the drive torque is controlled, and this is vulnerable to the influence of external disturbances. Particularly, in a portable type VTR, vibrations and rolling or changes in orientation are always occurring so that accurate servo control cannot be achieved with an electric current drive. In the case of a voltage drive, the motor speed is controlled, and this is not influenced, to the extent that motor torque is, by vibrations and/or rolling or rapid changes in orientation of the VTR. However, in the case where a voltage drive is employed in a tension servo, it is necessary to provide a very sensitive tension detector so as to improve the response and the accuracy of the tension servo mechanism.

Figure 5:
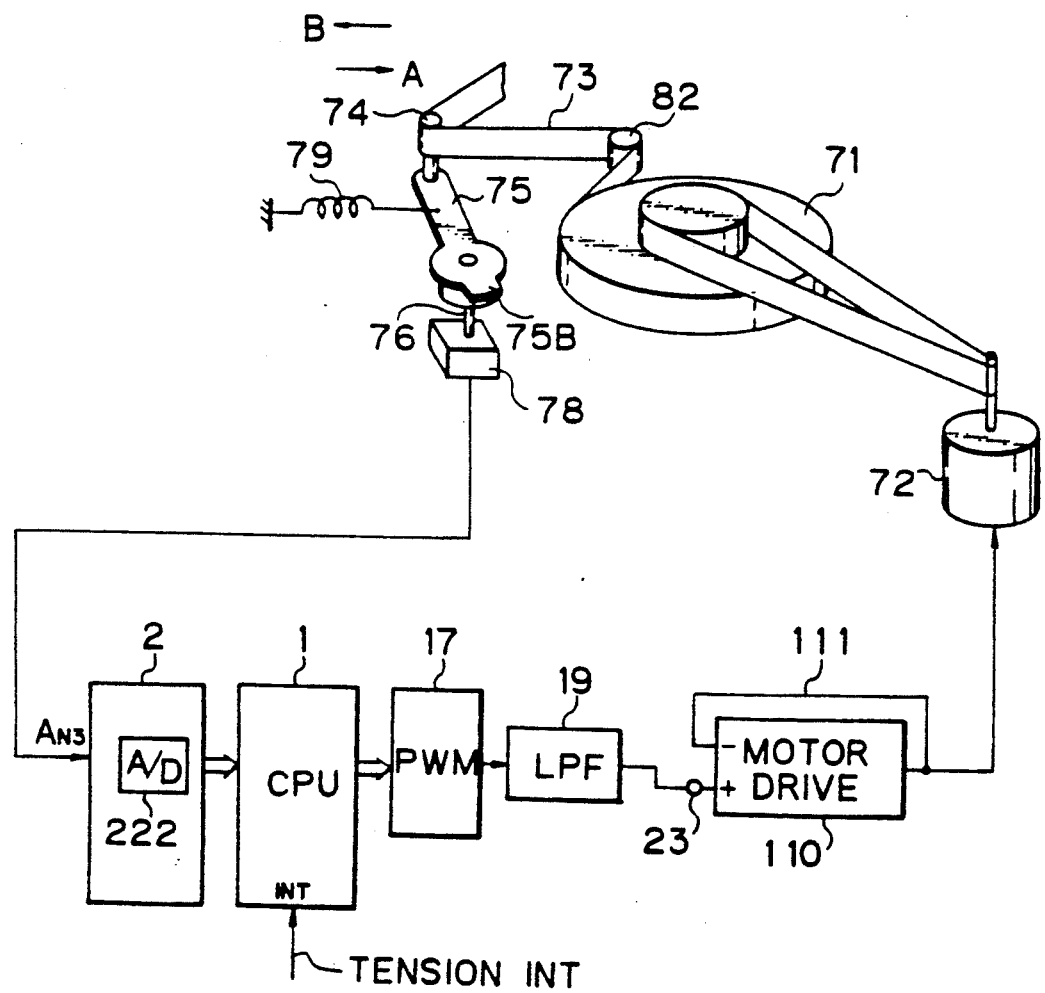
FIG. 5 is a perspective view to which reference will be made in describing the operation of a tension servo-system in accordance with the present invention.

Referring now to FIG. 5, it will be seen that, in a tension servo mechanism according to an embodiment of this invention, a supply reel 71 is driven by a supply reel motor 72, and a magnetic tape 73 being unwound from the supply reel 71 is guided first by a guide roller 82 and then by a ceramic post 74. The ceramic post 74 is mounted at one end of an arm 75 which is freely rotatable about a pivot 76 at its other end for detecting tension.

The ceramic post 74 has a low specific gravity, for example, of about 2.0, and is very light as compared with a conventional chrome-plated metal post used for tension detection and which, for example, has a specific gravity of 8. The arm 75 is also made of suitably light material, for example, of aluminum.

The arm 75 is yieldably urged in one direction about the pivot 76 by a spring 79. An angle sensor 78 is attached to the pivot 76 to provide a voltage signal indicating the angular position of the arm 75.

When the tape tension increases, the arm 75 is turned against the force of the spring 79 in the direction of the arrow A. When the tape tension decreases, the arm 75 is turned by the spring 79 in the direction of the arrow B. The angular position of the arm 75, as detected by the angle sensor 78, is an indication of the tape tension. The angle sensor 78 in FIG. 5 generally corresponds to the tension detector 46 referred to with reference to FIG. 1.

The output of the angle sensor 78 is supplied to the analog input terminal $A_{N3}$ of the universal pulse processor 2 as a tension detection signal. An A/D converter 222 is provided as a section of the universal pulse processor 2, and the output of the angle sensor 78 is digitized at the A/D converter 222 and supplied to the CPU 1.

In the CPU 1, the tension detected from the output of the angle sensor 78 is compared with a desired tension and, on the basis of such comparison, the control signal SR CONT for the supply reel motor 72, as produced by the PWM output circuit 17, is suitably varied for maintaining the desired tension.

As later described in detail, tension data detected from the output of the angle sensor 78 is taken into the CPU 1 at each predetermined period in response to a tension interrupt signal TENSION INT. At each such time, the control signal SR CONT is determined by performing a proportional control, a differentiation control and an integration control operation.

The control signal SR CONT for the supply reel as obtained from the PWM output circuit 17 is supplied through the direct current converting circuit 19 to a motor driver 110 (FIG. 5). The output of the motor driver 110 is supplied to the supply reel motor 72, and is also fed back in a loop 111 to an inverted input terminal of the motor drive 110 which is to have a low impedance. As earlier noted, the motor driver 110 is desirably a voltage drive type. Thus, the supply reel motor 72 is voltage driven by the motor driver 110 so that the rotational speed of the supply reel motor 72 is controlled to maintain a desired tension in the tape being withdrawn from the supply reel 71.

By using armature voltage for driving the supply reel motor 72, the dynamic braking effect of that DC motor is available for achieving more stable tension control with less oscillation then if current control had been used. When the supply reel motor 72 is voltage driven, as in the described embodiment of this invention, the motor speed tends to remain constant due to inertia which is desirable for avoiding the influence of vibrations and rolling which are unavoidable in the case of a portable VTR. However, for the same reason, it is necessary to provide the supply-reel motor servo with a tension detecting arrangement of increased sensitivity and accuracy. In the above described embodiment of this invention, the increased sensitivity is achieved, at least in part, by the light weight of the ceramic post 74 and of the aluminum arm 75. In other words, by reason of the light weight post 74 and arm 75, there is no need to provide a counter weight at the end 75B of the arm 75 remote from the tape engaging post 74. Consequently, there is only very small inertia to delay the response of the post 74 and arm 75 to a change in the tape tension.

Further, it is desirable that gravity exert little or no influence on the angular positioning of the arm 75 when the portable VTR is in any of its usual operating orientations.

Figure 6:
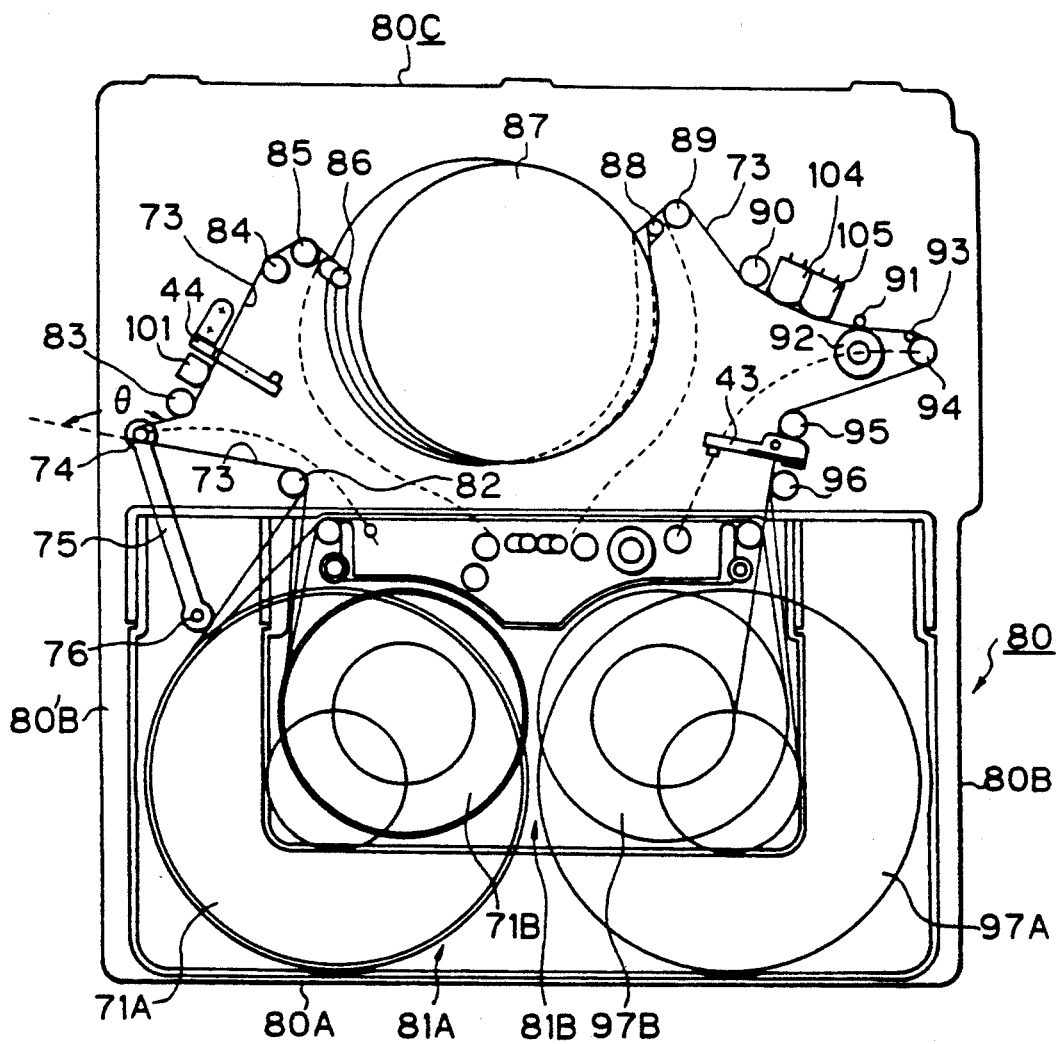
FIG. 6 is a plan view of a portable VTR provided with a tension servo-system according to an embodiment of this invention.

Referring to FIG. 6, in which the present invention is shown applied to a portable VTR capable of use with either a large-sized tape cassette 81A or a small-sized tape cassette 81B suitably positioned in a cassette holder (not shown) within a portable VTR housing 80 which, as viewed from above on FIG. 6, has a front wall 80A, opposite side walls 80B and 80'B and a back wall 80C. The tape 73 being unwound from the supply reel 71A or 71B of the cassette 81A or 81B, respectively, is withdrawn rearwardly from the cassette and then passes around a guide roller 82 and laterally outward toward the adjacent side wall 80'B of the housing. The arm 75 extends generally in the fore-and-aft direction adjacent the side wall 80'B with the pivot 76 at the forward end of the arm 75 and the post 74 extending from the rear end of the arm 75. The tape 73 is reverted about the post 74 and is then guided by guide rollers 83 and 84, a fixed guide 85 and a slant guide 86 to the entry side of the drum 87 which may have a motor associated therewith as previously described with reference to FIGS. 2A and 2B. After being wrapped around the drum 87, the tape 73 exists therefrom around a slant guide 88 and is then guided about fixed guides 89 and 90 so as to pass between a capstan 91 and a pinch roller 92. Finally, the tape 73 is guided from between the capstan 91 and pinch roller 92 about guide rollers 94, 95 and 96 for return to a take-up reel 97A or 97B of the cassette 81A or 81B, respectively. The tape top detector 43 and the tape end detector 44 referred to previously in relation to FIG. 1, are shown on FIG. 6 to be positioned adjacent the tape between the guide rollers 95 and 96, and between the guide rollers 83 and 84, respectively. It is also to be seen that a master erase head 101 is positioned for engagement with the tape 73 between the guide rollers 83 and 84, and that a CTL head 104 for recording and reproducing the CTL signal on the tape and an erase head 105 for erasing such signal are disposed adjacent each other for engagement with the tape 73 between the guide roller 90 and the capstan 91.

Figure 7A:
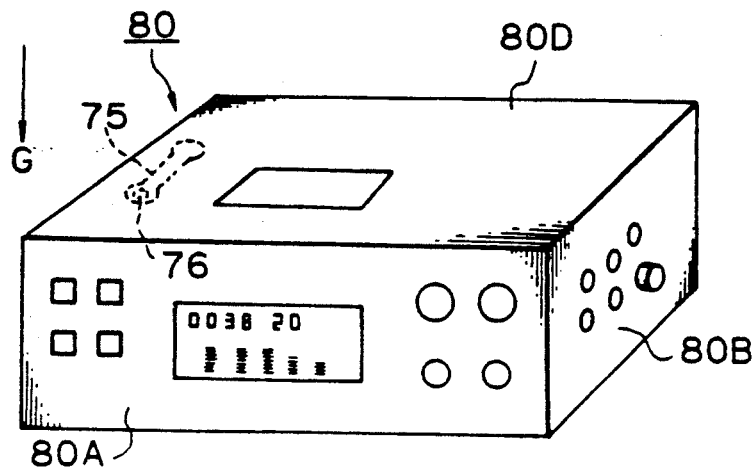
FIGS. 7A and 7B are schematic perspective views showing the VTR of FIG. 6 in respective normal orientations thereof.
Figure 7B:
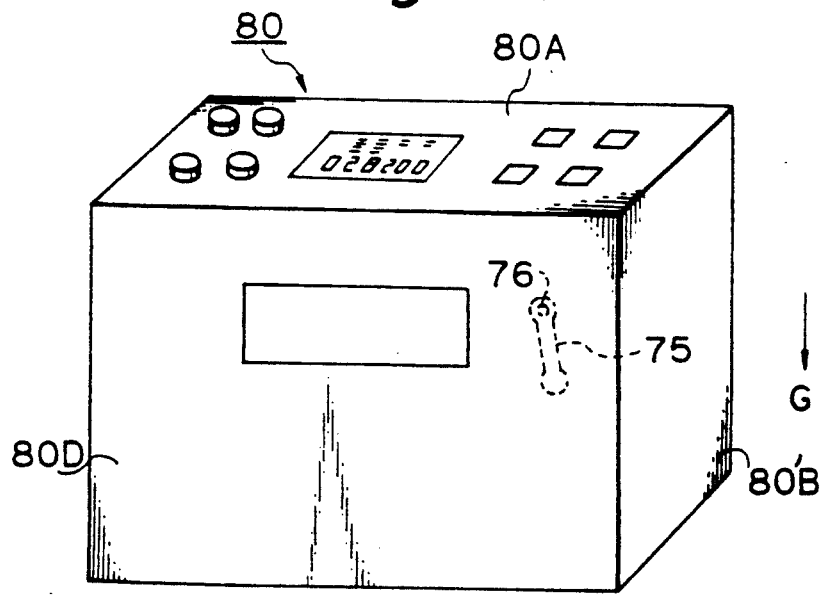

It will be appreciated from FIGS. 6, 7A and 7B, that the pivot 76 for the arm 75 defines an axis perpendicular to the plane of the top wall or panel 80D of the VTR housing 80, and that the pivot 76 is disposed so that, with the post 74 normally engaged by the tape 73, as on FIG. 6, the arm 75 may be said to extend from pivot 76 approximately parallel to the side walls 80B and 80'B of the housing 80. It can be further said that the arm 75, when engaged at the post 74 with the tape 73, is approximately at right angles to the front wall or panel 80A and is angularly movable in a plane that is substantially parallel with the top wall or panel 80D (FIG. 7A).

By reason of the foregoing, if the housing 80 is disposed in the orientation shown on FIG. 7A, that is, with the top wall 80D of the housing uppermost, gravity acting in the direction of the arrow G will not influence the angular position of the tension detecting arm 75. Similarly, if the VTR is operated with its housing 80 in the orientation shown on FIG. 7B, that is, with its front wall or panel 80A uppermost, the arm 75 depends from its pivot 76 so that swinging of the arm 75 about the pivot 76 in response to changes in the tension of the tape 73 engaging the post 74 is not substantially influenced or resisted by gravity acting in the direction of the arrow G. Therefore, the occurrence of errors in the detection of the tension in the tape due to gravity is avoided.

Further, as shown on FIG. 6, the wrap angle $\theta$ of the tape 73 about the post 74 is substantially greater than 90° and preferably is about at least 150°. By reason of such large wrap angle of the tape 73 about the post 74, the post 74 and arm 75 can be made light in weight, as previously noted, for increasing the responsiveness of the angular positioning of the arm 75 to changes in tape tension, without the concern that the post 74 and tape 73 may separate from each other in response to tension changes and give rise to oscillations in the tape when the post 74 hits the tape after being separated therefrom. In other words, the large wrap angle of the tape about the post 74 desirably serves to increase the compliance of the tape tension detecting system.

It is further to be noted that, with the arrangement of the tape 73 shown on FIG. 6, the back or uncoated surface of the tape 73 contacts the surface of the post 74. Such back surface of the tape 73 has a lower coefficient of friction than the surface of the tape defined by the magnetic coating, with the result that the post 74 exerts a decreased frictional resistance to the movement of the tape 73 therepast so that the accuracy of tension detection is increased.

Tension Servo Processing

Figure 8A:
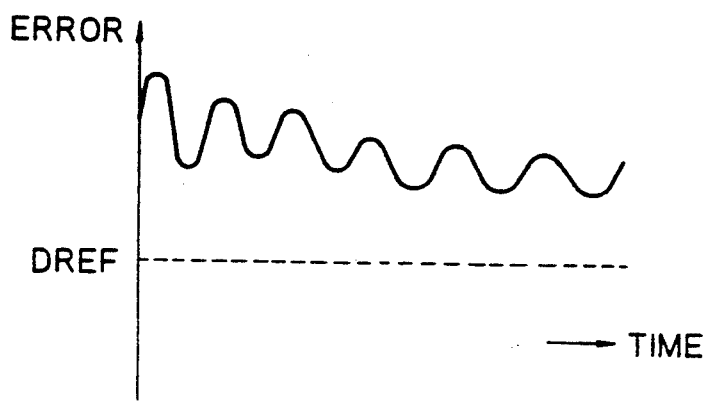
FIGS. 8A-8C are graphic illustrations of proportional, differential and integral control signals which are combined for controlling the supply reel driving motor in a tape tension servo-system embodying the present invention.

In conventional tension servo circuits, usually only a control signal that is proportional to the detected tension, as shown on FIG. 8A, is compared with a reference or desired tension signal $D_{REF}$, whereupon, the result of such comparison is employed, with a predetermined gain or amplification, to control the supply reel motor 72, with a view to maintaining the desired tension. However, resonance may occur between the tape 73 and the tension detecting arm 75, or between the tape 73 and the supply reel 71 when such proportional control is simply used, so that the gain cannot be set sufficiently high.

Figure 8B:
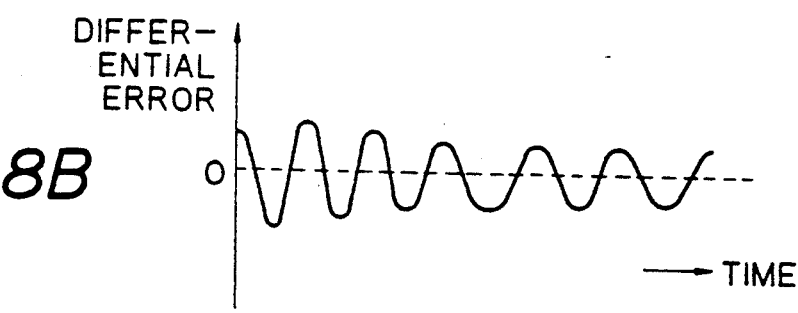
Figure 8C:
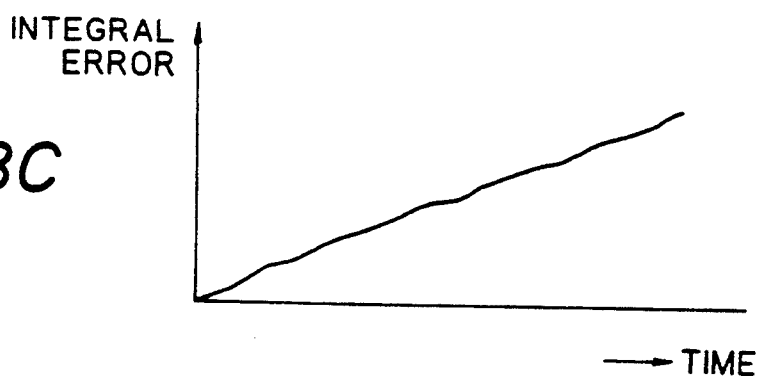

As distinguished from the foregoing, in accordance with an embodiment of this invention, the control of the supply reel motor 72 in response to a detected deviation or error of the tape tension is based upon a control signal proportional to such error, as above, and also on a control signal based on differentiation of the tension error and a control signal based on integration of the tension error, as shown on FIGS. 8B and 8C, respectively.

Figure 9:
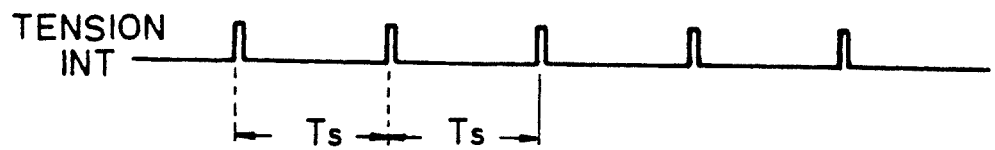
FIG. 9 is a timing diagram showing tension interrupt signals for initiating processing routines to be performed by a central processing unit included in a tape tension servo system embodying the prevent invention.
Figure 10:
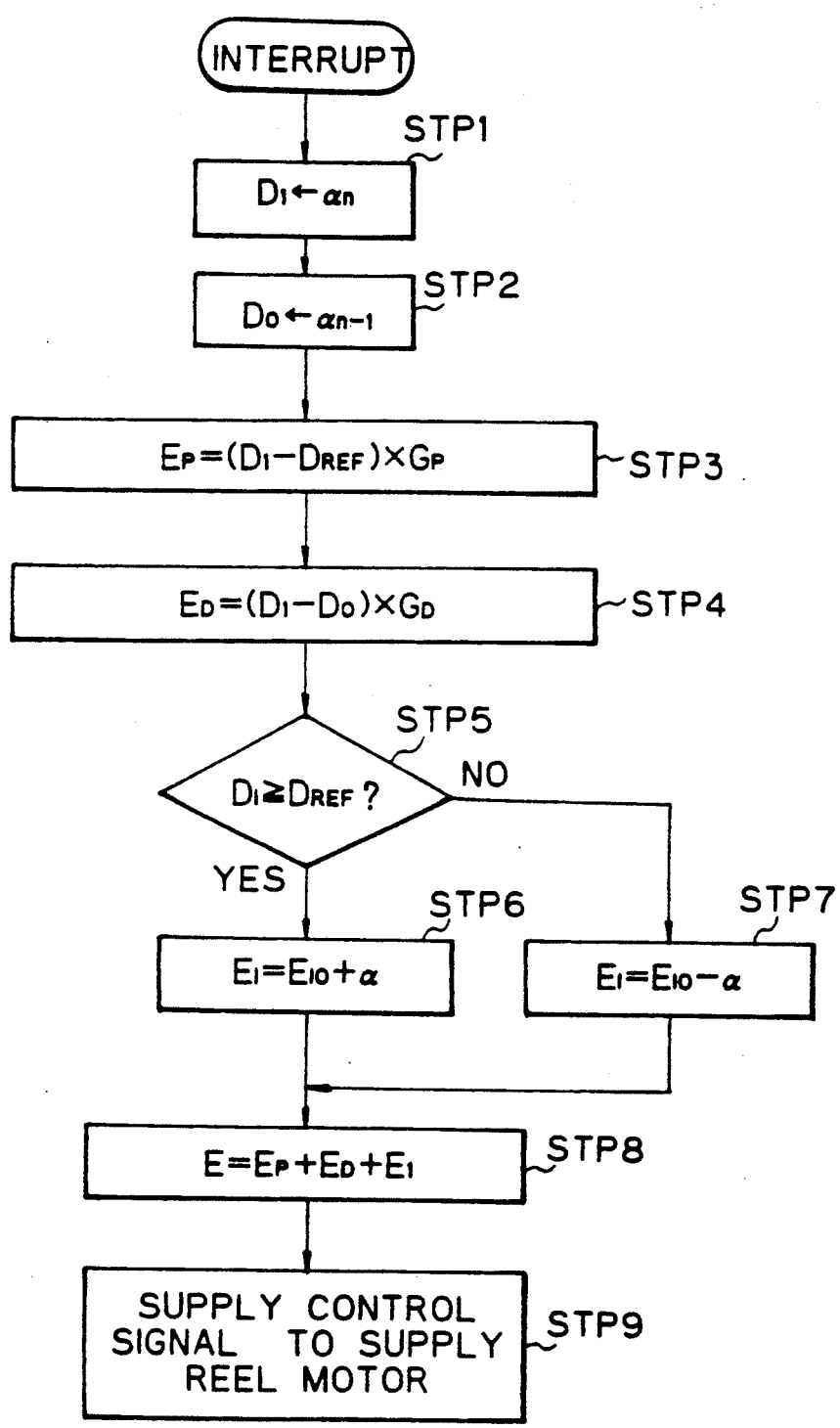
FIG. 10 is a flow chart to which reference will be made in explaining a processing routine of the central processing unit included in a tape tension servo-system embodying this invention.

More specifically, and with reference to FIG. 1, it will be seen that a tension interrupt signal TENSION INT is generated by the reference signal generator 8 at every period $T_S$ (FIG. 9). In the embodiment of the invention being here described, the frequency of the tension interrupt signal TENSION INT is, for example, 480 Hz. Such tension interrupt signal TENSION INT is supplied to the CPU I through the interrupt controller 7. Upon receipt of each tension interrupt signal TENSION INT, the CPU I performs an interrupt processing routine illustrated by the flow chart of FIG. 10, and by which a driving voltage for the supply reel motor 72 is determined.

In the step STP 1 following the initiation of the interrupt processing routine, angle data $d_n$ representing the angular position of the arm 75, and which has been supplied through the analog input terminal $A_{N3}$ of the universal pulse processor 2 to the A/D converter section 222 of the latter, is digitized and taken as data $D_1$ into the CPU 1.

Angle data $D_{n-1}$ provided in a prior processing routine is treated as data $D_0$ in step STP 2.

The data $D_1$ taken into the CPU 1 in step STP 1 and reference data $D_{REF}$ representing the desired tape tension are compared in step STP 3 to obtain proportional control error data. More specifically, proportional control error data $E_P$ is obtained in step STP 3 from the data $D_1$, the reference data $D_{REF}$ and the gain $G_P$ as follows:

$$E_P=(D_1-D_{REF})\times G_P$$

As earlier noted, the tension interrupt signal TENSION INT is generated at every predetermined period $T_S$, and angle data is obtained at every such period $T_S$. As a result, differentiation control error data is provided from the difference between the angle data $d_n$ at any time and the angle data $d_{n-1}$ from a previous processing cycle. Thus, in step STP 4, differentiation control error data $E_D$ is obtained from data $D_1$, data $D_0$ and a gain GD as follows:

$$E_D=(D_1-D_0)\times G_D$$

Assuming that an addition constant is $\alpha$, integration control error data is obtained by accumulating the addition constant $\alpha$ for previous integration control error data.

More specifically, it is judged in step STP 5 whether the data $D_1$ is at least equal to or exceeds reference data $D_{REF}$.

If the data $D_1$ is equal to or exceeds the reference data $D_{REF}$, the program proceeds to step STP 6 in which the present integration control error data $E_1$ is obtained by adding the addition constant $\alpha$ to the previous integration control error data $E_{10}$.

If the data $D_1$ is not at least equal to the reference data $D_{REF}$, the present integration control error data $E_1$ is obtained in step STP 7 by subtracting the addition constant $\alpha$ from the previous integration control error data $E_{10}$.

In the next step STP 8, the proportional control error data $E_P$ obtained at step STP 3, the differentiation control error data $E_D$ obtained at step STP 4, and the integration control error data $E_I$ obtained at step STP 6 or at step STP 7 are added, and a control voltage E is obtained as:

$$E=E_P+E_D+E_I$$

In the concluding step STP 9 of the routine, the supply reel motor 72 is driven by the control voltage E thus obtained.

Processing By The Universal Pulse Processor

Processing of various pulse signals can be carried out by the universal pulse processor 2 to enable simplification of the hardware by avoiding the necessity for providing individual pulse counters otherwise needed for various counting functions.

Thus, for example, for detecting a phase difference between the reference color frame pulse INPUT CF and the playback CTL color frame pulse PB CF in order to perform CTL phase control during low speed operation, it is necessary to count pulses during the phase difference between the reference color frame pulse INPUT CF and the playback CTL color frame pulse PB CF. Further, up/down counting of the playback CTL frame pulse PB CTL FRAME is necessary for displaying the hour, minute, second, and the frame number. Moreover, counting of the drum FG pulse DR FG PLS is needed to time the rotary head switching.

Pulse counting is also required for detecting a phase difference between the two-phase take-up reel FG pulses TR FG A PLS and TR FG B PLS in determining the rotational speed of the take-up reel.

In detecting the rotational speed of the supply reel, pulse counting is involved in detecting a phase difference between the two-phase supply reel FG pulses SR FG A PLS and SR FG B PLS.

In order to effect speed servo control of the capstan during low speed operation, pulse counting is involved in detecting a phase difference between the two-phase capstan FG pulses CAP FG A PLS and CAP FG B PLS.

The provision of all of individual counters for performing the above noted pulse counting functions would undesirably increase the circuit size. The pulse processor 2 makes it possible to avoid the need for plural counters effecting in the processing mentioned above, and thereby permits reduction of the size and complexity of the hardware.

General Arrangement Of The Universal Pulse Processor

The universal pulse processor 2 is a general purpose processor for controlling input/output of a pulse. This processor can be thought of as a mere memory from the CPU 1 side. Consequently, such a device may be called "an intelligent memory" which can store and also process data.

The universal pulse processor 2 may be of the type available from Hitachi of Japan as model No. HD 63140.

Figure 11:
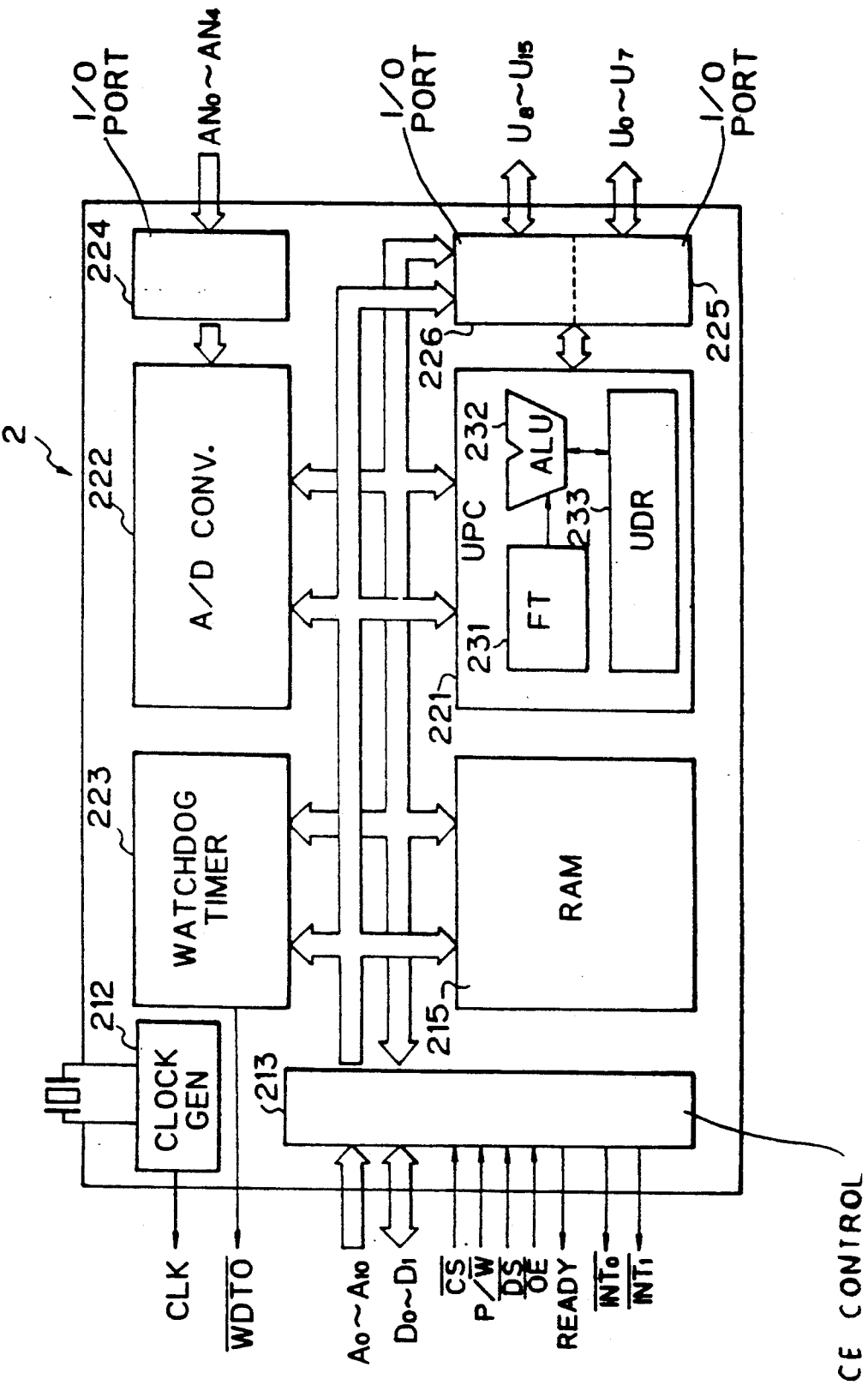
FIG. 11 is a block diagram illustrating a universal pulse processor associated with a central processing unit in a servo-system in accordance with an embodiment of this invention.

As shown in FIG. 11, the universal pulse processor 2 is composed of a universal pulse processor core (UPC) 221, the A/D converter section 222, and a watchdog timer (WDT) 223. Also included in the universal pulse processor 2 are a general purpose RAM 215 and a clock generator 212. Pulse signals from the terminals $U_0$ to $U_7$ and $U_8$ to $U_{15}$ which are led to the outside are input and output through I/O ports 225 and 226. Analog signals from the analog input terminals $A_{N0}$ to $A_{N9}$ are input through a port 224. Data transfer between the universal pulse processor 2 and the CPU 1 is carried out through an interface controller 213.

The universal pulse processor core (UPC) 221 is generally a programmable pulse input/output module with a built-in 16-bit arithmetic logic unit (ALU) and a counter, a shifter, a comparison register or a general purpose register serving as a catcher register and 16 pulse input/output terminals. With such arrangement, the core 221 can achieve efficient pulse control suitable for various applications. Also, since complicated pulse control can be effected automatically in response to 15 kinds of commands, the processing load on the CPU 1 can be reduced greatly.

More specifically, as shown on FIG. 12, the universal pulse processor core (UPC) 221 comprises a function table 231 in which a maximum of 16 functions are programmable, an arithmetic logic unit (ALU) 232 and twenty four universal pulse processor data registers (UDR) 233 each having 16 bits. The UPC 221 is further shown to have a pulse I/O 234 comprised of an UPP I/O register 237, an edge detector 238 and a status detector 239. An interrupt controller 240 is also included in the UPC 221 and is provided with interrupt status registers 243. A universal pulse processor (UPP) control 241 is provided for sequentially reading out and decoding the functions stored in the function table 231. Each read out function controls the ALU 232, the UDRs 233 and the pulse I/O 234 and is executed by an execution unit 242.

The programming or setting of the various functions in the function table 231 is effected in advance through a data bus. Since the execution of the set functions is performed sequentially step-by-step, the resolution of the pulse input/output depends on the number of functions that have been set. For example, the resolution is 5 $\mu$s in the case where 16 functions are set in the function table 231 and 4 MHz operation is effected with a 16 MHz crystal oscillator connected to the clock generator 212. Further, reading/writing in the UDR 233 are possible during the operation thereof.

The A/D converter 222 in the universal pulse processor 2 may be constituted by a 10-bit sequential comparison type A/D converter having 10 input channels connected with the I/O port 224, and up to 4 of such input channels may be selectively scanned.

The watchdog timer 223 in the universal pulse processor 2 may comprise a 10-bit prescaler, an 8-bit counter and a watchdog timer register (not shown). By way of example, the prescaler may count internal clocks of 2 MHz and provide a carry output to the 8-bit counter. The frequency dividing ratio may be set at 7 levels, for example, ranging from 0.128 to 13 ms in suitable steps. Normally, the 8-bit counter in the watchdog timer 223 is reset periodically through a data bus so that it does not overflow. However, if the counter overflows, an overflow signal $\overline{WDT0}$ is supplied from an overflow terminal of the watchdog timer 223 so that overflow in the system can be monitored by reference to such overflow signal.

Commands That Can Be Set By The Universal Pulse Processor

The universal pulse processor 2 can set fifteen different kinds of individual commands.

Commands FRS, INS, UDS and GTS are employed for performing the following counter/timer and pulse input functions:

The command FRS causes free run counting and capturing of the count by the leading or trailing edges of a designated signal;

The command INS causes a count to be captured and the counter to be simultaneously reset by the leading or trailing edge of a designated signal, as in the measurement of a pulse period;

The command UDS causes a counter to count up or down in response to a count direction designating signal, with the count being captured by the leading or trailing edge of a designated signal; and The command GTS causes the clock of a counter to be gated by a designated signal, with the count being captured by the leading or trailing edge of the gating signal.

Commands FRC, INC, PWC and OSC are employed for performing the following counter/timer and pulse output functions:

The command FRC causes free run counting and the production of a comparison result by reference to a value or the content in a comparison register;

The command INC causes a pulse to be output if the free running count coincides with the content of the comparison register, whereupon the counter is reset;

The command PWC causes a comparison output to be produced when the count corresponds to that in the comparison register, whereupon the counting continues until the counter is reset by a leading or trailing edge of a designated signal; and The command OSC causes counting to be initiated by a leading or trailing edge of a designated signal, with a one shot pulse being produced until the count coincides with that in the comparison register.

Commands FFC, TPC, GTC and CTO are employed for performing the following special counter/timer functions:

The command FFC causes output of a pulse with a 50% duty ratio;

The command TPC causes up-counting and down-counting to be effected in accordance with the phase relationship of 2-phase pulse signals;

The command GTC causes gating of the counter clock in response to a designated signal, the production of a comparison output from the comparison register when the count of the counter coincides with the content of the comparison register, and resetting of the counter by the leading or trailing edge of the gating signal; and The command CTO initiates counting in response to a logical product of a trigger signal and an enable signal, with a one shot pulse being produced until the count coincides with the content of the comparison register.

Commands SIT, SOT and SPO are employed for performing the following shifter and pulse input/output functions:

The command SIT causes an input signal to be shifted and latched by the leading or trailing edge of a designated signal;

The command SOT causes reloaded data to be output while shifting or rotating; and The command SPO causes reloaded data to be output in parallel while shifting or rotating.

In accordance with an embodiment of this invention, the following functions are set in the function table 231 in association with respective function keys FNR 1-FNR 12:

Function key FNR 1 uses the command FRS to effect counting operation of the data register UDR 1, with the count being captured by both the leading and trailing edges of the take-up reel FG pulse TR FG A PLS, and the resulting value or count of the data register UDR 1 is then taken into the data register UDR 4. The foregoing step is effective to set a register for detecting the direction of rotation of the take-up reel.

The function key FNR 2 uses the command TPC for counting up or down the data register UDR 0 in accordance with the phase relationship between the two-phase capstan FG pulses CAP FG A PLS and CAP FG B PLS. The foregoing step is effective to detect the phase difference between the two-phase capstan FG pulses CAP FG A PLS and CAP FG B PLS, and such detected phase difference is used to form a speed loop of the capstan during low speed operation.

The function key FNR 3 uses the command TCP for counting up or down the data register UDR 1 in accordance with the phase relationship between the two-phase take-up reel FG pulses TR FG A PLS and TR FG B PLS. The foregoing step detects the phase difference between the two-phase take-up reel FG pulses TR FG A PLS and TR FG B PLS, and such detected phase difference is employed for detecting the speed of the take-up reel.

The function key FNR 4 uses the command TPC for counting up or down the data register UDR 2 in accordance with the phase relationship between the two-phase supply reel FG pulses SR FG A PLS and SR FG B PLS. By the foregoing step, the phase difference between the two-phase supply reel FG pulses SR FG A PLS and SR FG B PLS is detected, and that detected phase difference is used for detecting the supply reel speed.

The function key FNR 5 uses the command FRC for comparing the value of the data register UDR 4 and the value in the data register UDR 1, as a comparison register, and produces a corresponding comparison result. As earlier noted, the function key FNR 1 causes a free running counting operation of the data register UDR 1, with the value of the data register UDR 1 being captured by both edges of the take-up reel FG pulse TR FG A PLS and taken into the data register UDR 4. Therefore, the comparison result obtained by comparing the value of the data register UDR 4 and the value of the data register UDR 1 in response to the function key FNR 5 serves to detect the direction of rotation of the take-up reel.

The function key FNR 6 uses the command FRS for causing counting operation of the data register UDR 6 and capture thereof by the trailing edge of the capstan FG pulse CAP FG A PLS, with the resulting value of the data register UDR 6 being taken into the data register UDR 7. The foregoing step serves to detect the rotation period of the capstan.

The function key FNR 7 uses the command FRS for causing the data register UDR 9 to count the drum FG pulse DR FG PLS. The resulting count value in the data register UDR 9 can be the basis for head switching timing.

The function key FNR 8 uses the command INS for causing the data register UDR 8 to perform a count operation and to be reset by the leading edge of the playback CTL color frame pulse PB CF. The foregoing step is effective to provide an inclined or sawtooth wave which is reset by the leading edge of the playback CTL color frame pulse PB CF.

The function key FNR 9 uses the command FRS for capturing the value of the data register UDR 8 by the leading edge of the reference color frame pulse INPUT CF, whereupon the value of the data register UDR 8 is taken into the data register UDR 11. By reason of the foregoing, the inclined wave formed in response to the function key FNR 8 is captured by the leading edge of the reference color frame pulse INPUT CF, so that the phase difference between the leading edge of the reference color frame pulse INPUT CF and the leading edge of the playback CTL color frame pulse PB CF may be detected therefrom.

The function key FNR 10 uses the command INS to initiate the counting operation of the data register UDR 12 and the resetting thereof by the trailing edge of the playback CTL color frame pulse PB CF. The foregoing step is effective to produce an inclined or sawtooth wave which is reset by the trailing edge of the playback CTL color frame pulse PB CF.

The function key FNR 11 uses the command FRS for capturing the value of the data register UDR 12 by the trailing edge of the reference color frame pulse INPUT CF, whereupon, the captured value of the data register UDR 12 is taken into the data register UDR 11. By the foregoing step, the inclined wave formed in response to the function key FNR 10 is captured by the trailing edge of the reference color frame pulse INPUT CF, and the phase difference between the trailing edge of the reference color frame pulse INPUT CF and the trailing edge of the playback CTL color frame pulse PB CF may be detected from the value taken into the data register UDR 11. A CTL phase lock loop is formed from the phase differences obtained in response to the function keys FNR 9 and FNR 11, respectively.

The function key FNR 12 uses the command UDS for causing the data register UDR 10 to count up or down the playback CTL color frame pulse PB CF in accordance with the direction of rotation of the take-up reel as indicated by the signal TR DIR applied to the terminal $U_0$. The resulting count value of the data register UDR 10 can be employed for producing a tape timing display which may include the hour, minute, second and frame number.

It will be appreciated from the above that the universal pulse processor 2 is selectively operative to detect the phase difference between the reference color frame pulse INPUT CF and the playback CTL color frame pulse PB CTL FRAME by means of the function keys FNR 8–FNR 11; to effect the up/down counting of the playback CTL frame pulse PB CTL FRAME by means of the function key FNR 12; to effect the counting of the drum FG pulse DR FG PLS by means of the function key FNR 7; to detect the phase difference between the two-phase take-up reel FG pulses TR FG A PLS and TR FG B PLS by means of the function key FNR 3; to detect the direction of rotation of the supply reel by means of the function keys FNR 1 and FNR 5; to detect the phase difference between the two-phase supply reel FG pulses SR FG A PLS and SR FG B PLS by means of the function key FNR 4; to detect the phase difference between the two-phase capstan FG pulses CAP FG A PLS and CAP FG B PLS by means of the function key FNR 2, and to detect the rotation period of the capstan by means of the function key FNR 6, all of which functions would otherwise require individual counters. Thus, by combining the universal pulse processor 2 with the CPU 1, the hardware needed for performing the various functions required by the servo-system of the VTR is very substantially simplified.

It is further to be noted that, in accordance with this invention, the supply reel motor is voltage driven so as to be less vulnerable to vibration and rolling or changes in orientation, and that the improvement in the tension detecting system made necessary by the voltage driven supply reel motor is achieved, in accordance with the invention, by reducing the weight of the tension detecting mechanism, for example, by forming the post 74 of a ceramic, by disposing the arm 75 so that the effect of gravity on its movements is minimized, and by substantially increasing the winding angle of the tape 73 about the post 74 so that the compliance can be made large.

Finally, it will be noted that, in accordance with this invention, the tension servo system employs differential, integrated and proportional detected tension signals which are combined for control of the tape tension, with the differential and integrated detected tension signals being generated by the CPU 1 during a routine that is repeatedly executed in response to the tension interrupt signal which, for example, has the frequency 480 Hz. In other words, the proportional, differential and integrated detected tension signals to be combined for determining the driving voltage for the supply reel motor 72, and thereby controlling the tape tension, are readily calculated on the basis of the differences between the detected tensions at successive tension interrupt signals.

Although illustrative embodiments of the invention have been described in detail herein with reference to the accompanying drawings, it is to be understood that the invention is not limited to such precise embodiments, and that various changes and modifications may be effected therein by one skilled in the art without departing from the scope or spirit of the invention as defined in the appended claims.

What is claimed is:

1. An apparatus for recording and/or reproducing video signals in slant tracks on a tape during longitudinal advancement of the tape, the apparatus having a rotary mechanism rotated by a respective drive means in a manner to vary tension in the tape, and a tension servo-system comprising:
   detecting means for detecting tape tension and providing a corresponding detected tension signal;
   processing means receiving said detected tension signal for generating a corresponding control signal applied to said drive means for controlling the latter in the sense to maintain said tape tension at a desired value; and
   means periodically applying tension interrupt signals to said processing means;
   said processing means being programmed to execute an interrupt processing routine in response to each of said tension interrupt signals and in which said processing means generates a control signal proportional to any deviation of the then detected tape tension from said desired value, a differential control signal corresponding to a difference between said deviation for successive interrupt processing routines and an integrated control signal, and in which said processing means combines said proportional, differential and integrated control signals for providing said control signal applied to said drive means.

2. An apparatus according to claim 1; further comprising a drum about which said tape is wrapped between supply and take-up reels, rotary head means associated with the drum for said recording and/or reproducing of video signals in said slant tracks, a capstan driven by a capstan motor and engageable with said tape between said drum and said take-up reel for effecting said longitudinal advancement of the tape, a supply reel motor and a take-up reel motor for driving the supply reel and the take-up reel, respectively, in directions for unwinding and rewinding the tape on said supply and take-up reels, respectively, during said longitudinal advancement; and in which said tension in the tape is detected between said supply reel and said drum, and said drive means is said supply reel motor to which said control signals is supplied from said processing means for maintaining said desired value of the tape tension.

* * * * *